United States Patent [19]

Shiomoto

[11] Patent Number: 5,910,866
[45] Date of Patent: Jun. 8, 1999

[54] DEVICE FOR CONNECTING SIGNALS TO A TAPE REPRODUCING APPARATUS IN WHICH A SIGNAL TRANSMITTING HEAD IS BIASED TO ABUT A MAGNETIC HEAD OF A TAPE REPRODUCING APPARATUS

[75] Inventor: Shinji Shiomoto, Tokyo, Japan

[73] Assignee: Sony Corporation, Tokyo, Japan

[21] Appl. No.: 08/904,959

[22] Filed: Aug. 1, 1997

[30] Foreign Application Priority Data

Aug. 16, 1996 [JP] Japan .................................... 8-216451

[51] Int. Cl.⁶ .............................. G11B 31/00; G11B 5/48
[52] U.S. Cl. .................................................. 360/104; 369/2
[58] Field of Search .................................... 360/132, 137, 360/104, 109; 369/2

[56] References Cited

U.S. PATENT DOCUMENTS

| | | | |
|---|---|---|---|
| 4,734,897 | 3/1988 | Schotz | 369/2 |
| 5,055,947 | 10/1991 | Satoh | 360/62 |
| 5,161,131 | 11/1992 | Borchardt et al. | 369/1 |
| 5,307,326 | 4/1994 | Osawa | 369/2 |
| 5,444,675 | 8/1995 | De Bie et al. | 369/2 |
| 5,586,090 | 12/1996 | Otte | 369/2 |
| 5,654,942 | 8/1997 | Akahane | 369/2 |
| 5,794,138 | 8/1998 | Briskman | 455/344 |

FOREIGN PATENT DOCUMENTS 2286918  8/1995  United Kingdom .

*Primary Examiner*—Jefferson Evans
*Attorney, Agent, or Firm*—Jay H. Maioli

[57] ABSTRACT

A connection device, loaded on a tape reproducing apparatus adapted for reproducing a magnetic tape, for transmitting an output signal from a sound source to the tape reproducing apparatus has a housing, a signal transmitting head, a transmission mechanism and a supporting mechanism. The housing is shaped for enabling its loading on the tape reproducing apparatus, and includes a pair of reel shaft inserting openings formed through its upper and lower surfaces and at least an opening formed in one of its lateral surfaces. The signal transmitting head is provided in the housing for facing outwards via the opening and is abutted against a magnetic head of the tape reproducing apparatus intruded via the opening. The transmission mechanism transmits an output signal from the sound source to the signal transmitting head. The supporting mechanism supports the signal transmitting head and biases the signal transmitting head in a direction of abutment against the magnetic head of the tape reproducing apparatus and rotatable supports the signal transmitting head in meeting with the movement of the magnetic head of the tape reproducing apparatus.

21 Claims, 6 Drawing Sheets

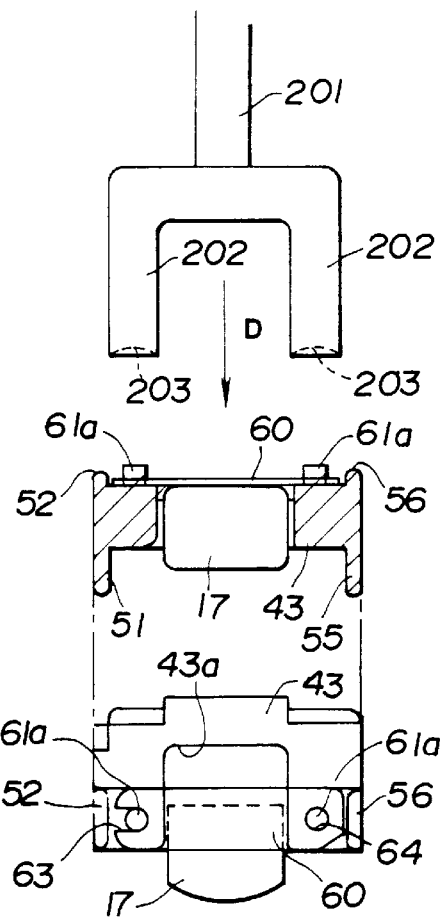
FIG.8a
FIG.8b
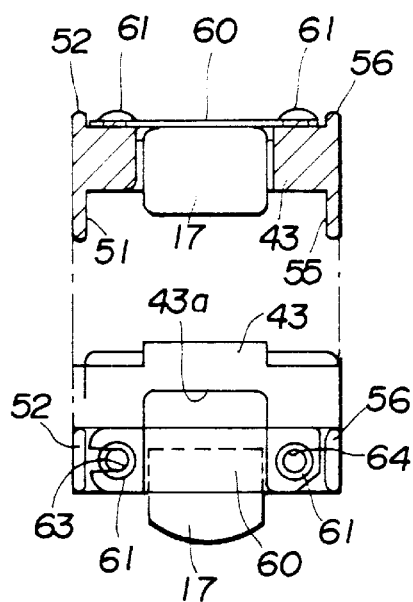
FIG.9a
FIG.9b

DEVICE FOR CONNECTING SIGNALS TO A TAPE REPRODUCING APPARATUS IN WHICH A SIGNAL TRANSMITTING HEAD IS BIASED TO ABUT A MAGNETIC HEAD OF A TAPE REPRODUCING APPARATUS

BACKGROUND OF THE INVENTION

1. Field of the Invention

This invention relates to a connection device and, more particularly, to a connection device used for connection between a sound source and a reproducing device employing a tape cassette.

2. Description of the Related Art

There has so far been proposed a connection device for transmitting information signals from an external equipment to a magnetic head of a magnetic tape reproducing device, such as a so-called cassette tape player. Such connection device is used for reproducing information signals outputted by a portable optical disc player, that is, acoustic signals of an optical disc, using, for example, a car-laden cassette tape player device, referred to herein as a car stereo device, as disclosed for example in U.S. Pat. Nos. 4,7348,97 and 5,444,675.

This connection device has a casing which is formed for being loaded on the car stereo device. This casing is shaped similarly to a casing of a tape cassette used as a signal recording medium for the car stereo device. That is, the casing of the connection device is loaded by an operation similar to the operation of loading a tape cassette on the car stereo device.

In the casing of the connection device is enclosed a signal transmitting head electro-magnetically coupled to a magnetic head of the car stereo device for transmitting information signals. Similarly to the magnetic head, this signal transmitting head has a core having a magnetic gap and a coil for generating a magnetic field within the magnetic gap. The coil of the signal transmitting head is connected to a connection cord pulled out of the casing. The foremost part of the connection cord carries a connection plug to be connected to a signal output terminal of an external acoustic equipment operating as a sound source, such as an optical disc player device. By connecting this connection plug to the signal output terminal of the external equipment and operating the external acoustic equipment, the information signals outputted by the external equipment are supplied to the coil of the signal transmitting head. The coil fed with the information signals from the external equipment are routed to the coil of the signal transmitting head. The coil, thus fed with the information signals from the external equipment, generates a magnetic field corresponding to the information signals within the magnetic gap.

When the casing is mounted on the car stereo device, the signal transmitting head and their magnetic head have the respective front surfaces abutted to each other, with the respective magnetic gaps substantially facing each other, so that a magnetic field corresponding to the information signals is generated in the magnetic gap of the signal transmitting head for transmitting the information signals to the magnetic head. Specifically, with the magnetic head, the magnetic field generated in the magnetic gap of the signal transmitting head operates similarly to the magnetic field transmitted by a magnetic tape carrying the recorded signals when the magnetic tape runs in contact with the magnetic head. The result is that output signals of the magnetic head are processed by the car stereo device in the same way as in reproducing a usual tape cassette and outputted as audible sound from a speaker of the car stereo device.

In such connection device, the signal transmitting head needs to be positively contacted with the front surface of the magnetic head for reliably transmitting the information signals to the magnetic head. This signal transmitting head cannot transmit the information signals optimally to the magnetic head unless the magnetic gap of the signal transmitting head substantially faces that of the magnetic head.

Even if the mounting position of the magnetic head in the car stereo device is within a pre-set tolerance, such position differs slightly from one product to another. Thus, even if the signal transmitting head is mounted with accurate positioning on the casing of the connection device, there are occasions wherein the signal transmitting head cannot be correctly abutted against the magnetic head when loading the cassette on the car stereo device, depending on the difference of the magnetic head mounting position from one car stereo device to another.

Therefore, in some of the connection devices, means are provided for enabling the user to make manual adjustment of the position of the signal transmitting head relative to the casing of the connection device.

In such connection device, the signal transmitting head is mounted on the casing via a position adjustment mechanism which permits the user to make some manual adjustment. In this position adjustment mechanism, the signal transmitting head is mounted for movement relative to the casing via a resilient member, such as a coil spring. This position adjustment mechanism is provided with a knob that can be actuated by the user from outside the casing. If, in this position adjustment mechanism, the adjustment knob is actuated manually by the user, the movement of the adjustment knob is transmitted to the signal transmitting head via a cam, thus modifying the state of abutment of the signal transmitting head against the magnetic head.

The user of the connection device actuates the signal transmitting head via the adjustment knob for manually finding the signal transmitting head position which will optimize transmission of the information signals from the signal transmitting head to the magnetic head.

With the above-described connection device, the position adjustment mechanism is provided for enabling position adjustment for varying the state of abutment of the signal transmitting head against the magnetic head. However, the device is complex in structure due to the provision of the position adjustment mechanism. The position adjustment mechanism requires an adjustment knob movably mounted on the casing, a cam connected to the adjustment knob, a head holder secured to the casing, a coil spring interposed between the head holder and the signal transmitting head or guide members for regulating the path of movement of the signal transmitting head. In addition, these components need to be mounted within the above casing.

In the above-described connection device, position adjustment of the signal transmitting head relative to the casing by the user is complex, while the possibility is high that the device be used in the absence of the correct adjustment or the user fail to perform the adjustment.

SUMMARY OF THE INVENTION

It is there fore an object of the pre sent invention to provide a connection device which resolves the above-mentioned problem.

According to the present invention, there is provided a connection apparatus loaded on a tape reproducing apparatus adapted for reproducing a magnetic tape for transmitting an output signal from a sound source to the tape reproducing apparatus. The connection apparatus has a housing, a signal transmitting head, a transmission mechanism and a supporting mechanism. The housing is shaped for enabling its loading on the tape reproducing apparatus. The signal transmitting head is provided in the housing for facing outwards via the opening. The signal transmitting head is abutted against a magnetic head of the tape reproducing apparatus. The transmission mechanism transmits an output signal from the sound source to the signal transmitting head. The supporting mechanism supports the signal transmitting head. The supporting mechanism biases the signal transmitting head in a direction of abutment against the magnetic head of the tape reproducing apparatus and rotatably supports the signal transmitting head in meeting with the movement of the magnetic head of the tape reproducing apparatus.

According to the present invention, there is also provided a connection apparatus loaded on a tape reproducing apparatus adapted for reproducing a magnetic tape for transmitting an output signal from a sound source to the tape reproducing apparatus. The connection apparatus has a housing, a signal transmitting head, a transmission mechanism and a supporting mechanism. The housing is shaped for enabling its loading on the tape reproducing apparatus, and includes a pair of reel shaft inserting openings formed through its upper and lower surfaces and at least an opening formed in its one lateral surface. The signal transmitting head is provided in the housing for facing outwards via the opening. The signal transmitting head is abutted against a magnetic head of the tape reproducing apparatus intruded via the opening. The transmission mechanism transmits an output signal from the sound source to the signal transmitting head. The supporting mechanism supports the signal transmitting head. The supporting mechanism biases the signal transmitting head in a direction of abutment against the magnetic head of the tape reproducing apparatus and rotatably supports the signal transmitting head in meeting with the movement of the magnetic head of the tape reproducing apparatus.

BRIEF DESCRIPTION OF THE DRAWINGS

FIGS. 8a and 8b are a front view and a bottom view, respectively, showing a step of mounting a signal transmitting head on a head holder.

FIGS. 9a and 9b are a front view and a bottom view, respectively, showing the state in which the signal transmitting head has been mounted on the head holder.

DESCRIPTION OF THE INVENTION

Figure 1:
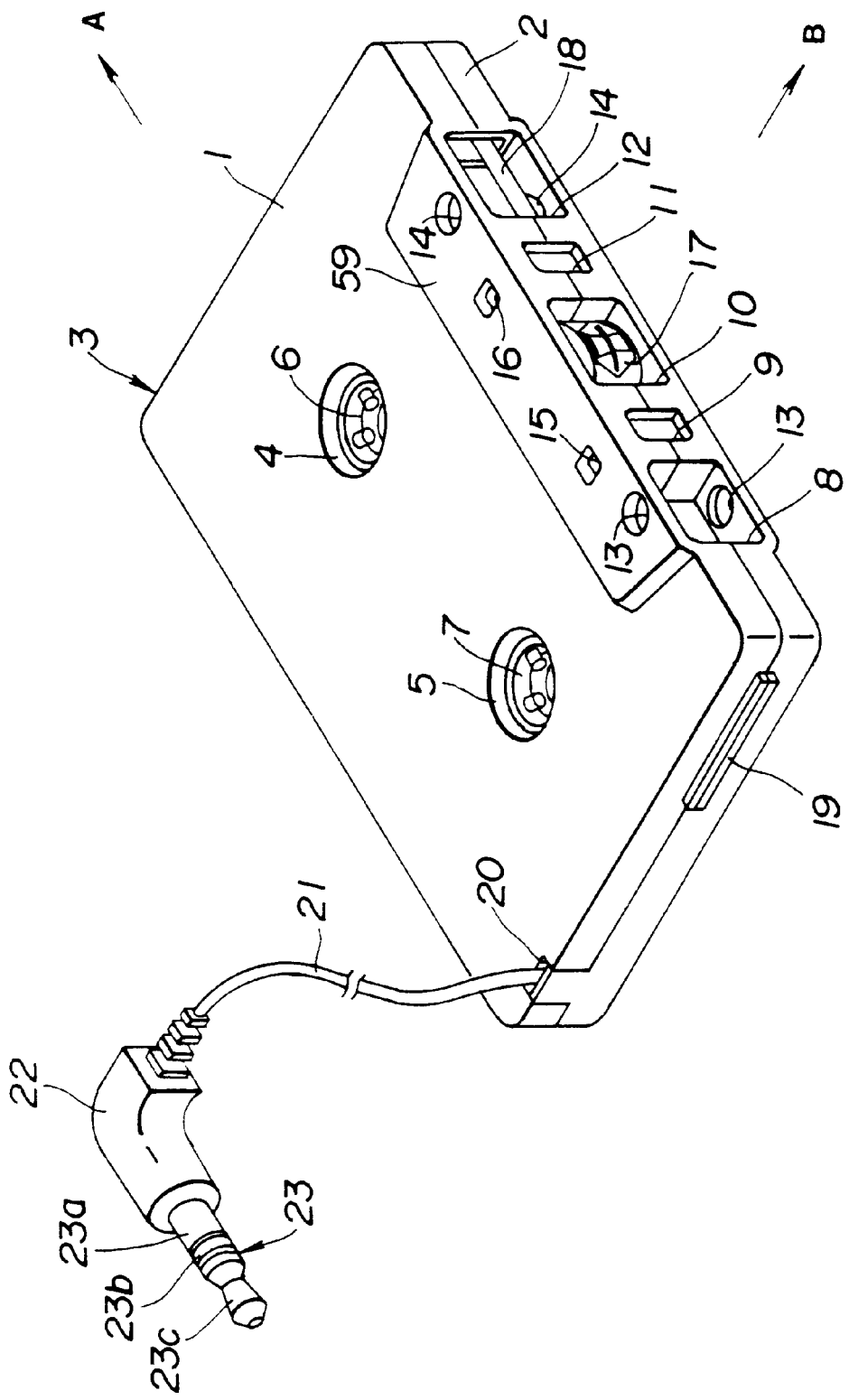
FIG. 1 is a perspective view showing a connection device embodying the present invention.

Referring to the drawings, a connection device according to the present invention will be explained in detail. A connection device, shown herein as an illustrative embodiment, is designed for connecting an external device as a sound source, such as a portable optical disc player, and a car-laden cassette tape player, referred to herein simply as a cassette tape player. If the connection device of the present embodiment is loaded on a cassette tape player and a connection plug is connected to the portable optical disc player, analog audio signals as information signals reproduced by the portable optical disc player are transmitted via the connection device to the cassette tape player.

Figure 2:
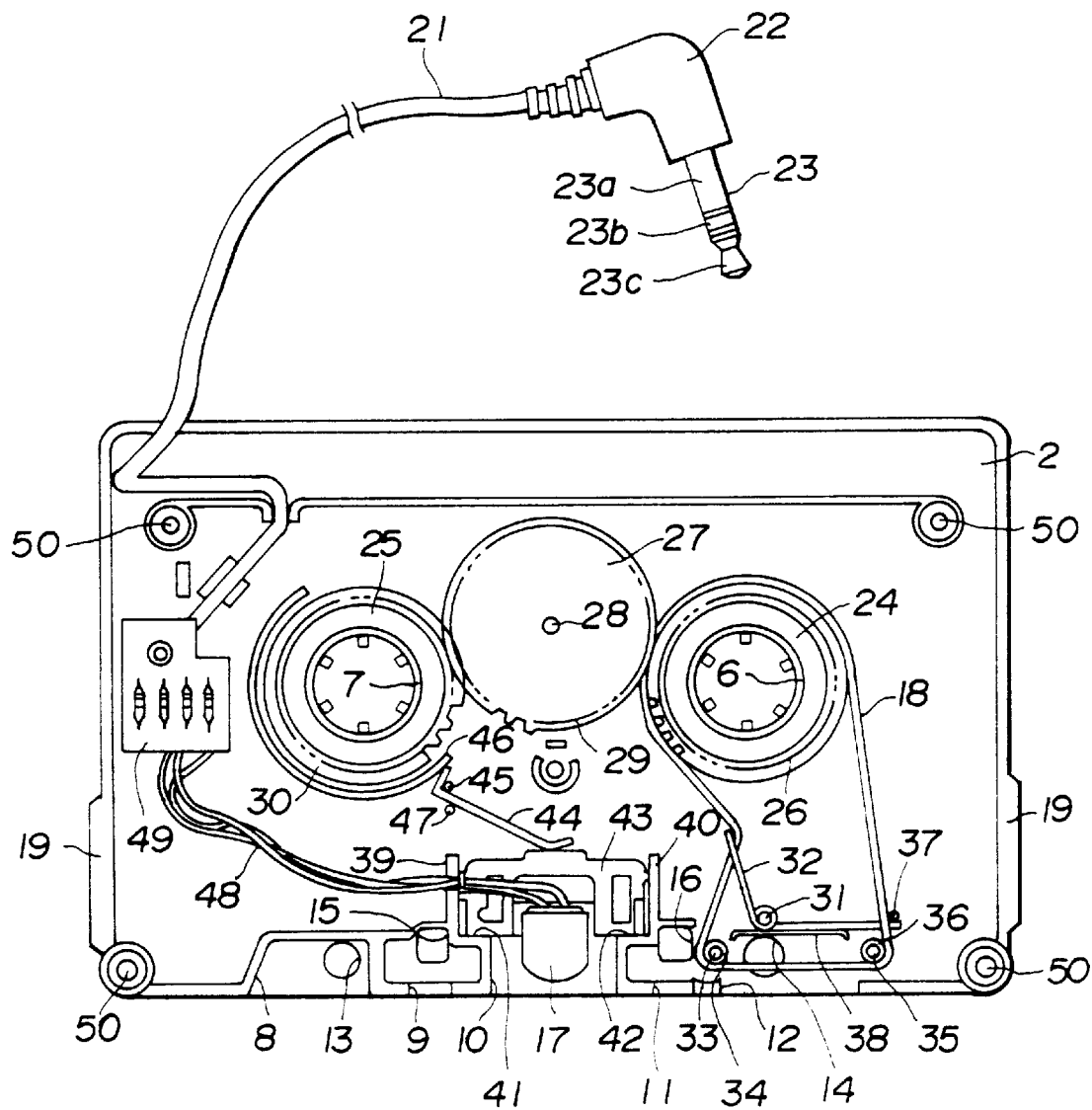
FIG. 2 is a plan view showing the internal structure of the connection device.

Referring to FIG. 1, a connection device embodying the present invention includes a casing 3 shaped similarly to the outer profile of a Phillips type tape cassette or a so-called Compact Cassette (registered trade name) for loading on a cassette tape player. Similarly to the Phillips type tape cassette, this casing 3 is made up of paired upper and lower halves 1, 2 abutted and connected to each other to form a rectangular thin casing having upper and lower major surfaces. Referring to FIG. 2, the lower half 2 has tapped holes 50 at four corners into which set screws, not shown, are introduced from below into plural screw boss sections formed in the inner wall section of the upper half 1 for securing the lower half 2 to the upper half 1.

Figure 3:
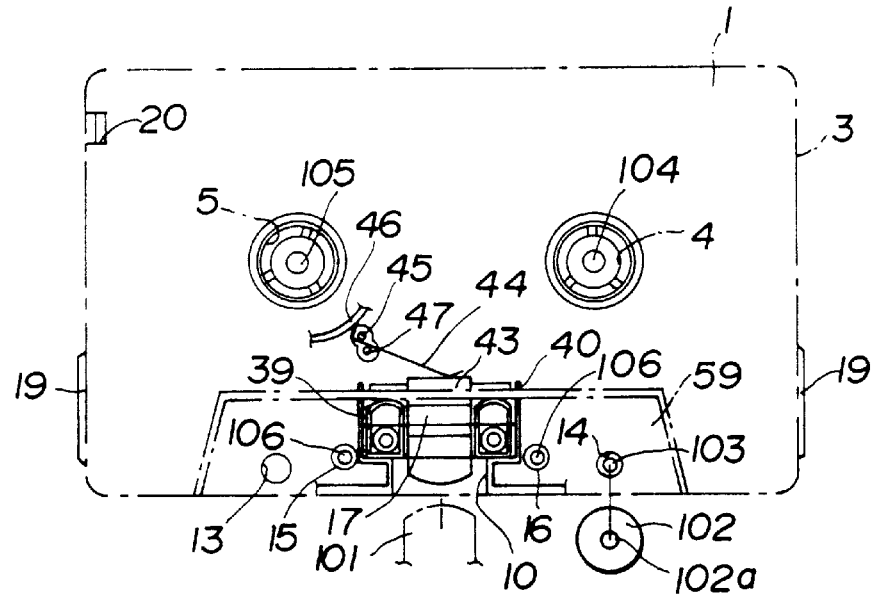
FIG. 3 is a plan view showing the relative position between the connection device shown in FIG. 1 and a magnetic head, a pinch roll and a capstan of a cassette tape player.
Figure 4:
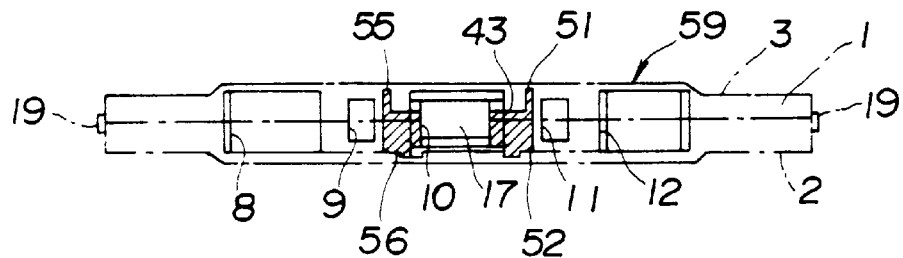
FIG. 4 is a plan view showing the relative position between a casing of the connection device shown in FIG. 1 and a signal transmitting head.
Figure 5:
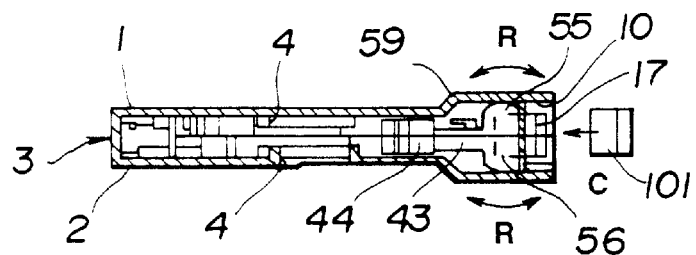
FIG. 5 is a longitudinal cross-sectional view of the connection device.

This casing 3 may be loaded on the cassette tape player by an operation similar to the operation of loading the tape cassette on the car stereo device by insertion in a direction indicated by arrows A or B in FIG. 1. The casing 3 has a pair of positioning ribs 19, 19 on both lateral sides thereof and a vertically elongated widened portion 59 for permitting entrance of a magnetic head 101 of the cassette tape player on the forward end thereof, as shown in FIGS. 3 and 5. On the front side of the casing 3, there are formed a magnetic head intrusion opening 10 at a mid portion of the widened portion 59, a pair of detection member intrusion openings 9, 11 on both sides of the magnetic head intrusion opening 10 and a pair of pinch roll intrusion openings 8, 12 on both lateral sides of the detection member intrusion openings 9, 11.

The casing 3 has, on its upper and lower sides above the widened portion 59, a pair of capstan shaft insertion openings 13, 14, 13, 14, while having a pair of reel shaft insertion openings 4, 5, 4, 5 on its upper and lower surfaces. When loaded on the cassette tape player, the casing 3 has a pair of positioning holes 15, 16 on its lower surface (towards the chassis of the cassette tape player) engaged in a pair of positioning pins 106, 106 of the cassette tape player, while having its rear edge thrust forwards by a spring plate, not shown. Moreover, the casing 3 is positioned on the tape cassette loading unit of the cassette tape player by having the positioning ribs 19, 19 extended along a positioning wall section, not shown.

When the casing is loaded on the cassette tape player, paired reel driving shafts 104, 105 are inserted into the reel shaft insertion openings 4. 5. When the tape cassette is loaded on the cassette tape player, each of the reel driving shafts 104, 105 are engaged with a hub of each tape reel of the tape cassette for rotating the tape reels.

When the casing is loaded on the cassette tape player, the capstan shaft 103 of the cassette tape player is inserted into one or both of the capstan shaft insertion openings 13, 14. When the tape cassette is loaded on the cassette tape player, the capstan shaft 103 feeds the magnetic tape of the tape cassette in cooperation with a pinch roll 102 as later explained.

When the casing 3 is loaded on the cassette tape player, the magnetic head 101 of the cassette tape player faces the magnetic head intrusion opening 10, while the pinch roll 102 of the cassette tape player faces one or both of the pinch roll insertion openings 8, 12. When the tape cassette is loaded on the cassette tape player, the magnetic head 101 reads out information signals from the magnetic tape of the tape cassette. The pinch roll 102 is a rubber roll rotatably supported by a supporting shaft 102a and clamps the magnetic tape in cooperation with the capstan shaft 103. By the capstan shaft 103 being rotated at a constant speed, the pinch roll 102 is rotated so as to follow the rotation of the capstan shaft 103 foe feeding the magnetic tape.

Within the casing 3, a pair of reel hubs 24, 25 are rotatably mounted at a position in register with tape reels in the tape cassette. These reel hubs 24, 25 are substantially toroidally-shaped and center openings 6, 7 are positioned coaxially with the reel shaft inserting openings 4, 5. On the inner rim of the center openings 6, 7 are formed plural protrusions engaged by outer peripheral surfaces of the reel shaft inserting openings 4, 5. When the casing 3 is loaded on the cassette tape player, the center openings 6, 7 are engaged by the reel driving shafts 104, 105, such that the protrusions formed on the inner rim of the center openings 6, 7 are engaged with the outer peripheral surfaces of the reel driving shafts 104, 105.

The outer peripheral surfaces of the reel hubs 24, 25 are formed with gears 26, 30. Between the reel hubs 24, 25 is rotatably mounted a transmission gear (idle gear) 27 being carried by a supporting shaft 28 provided in the casing 3. The transmission gear 27 has outer peripheral gear teeth 29 meshing with gear teeth 26, 30 of the reel hubs 24, 25. That is, the reel hubs 24, 25 transmit rotation to each other with interposition of the transmission gear 27.

An endless rubber belt 18 is placed around the outer peripheral surface of the reel hub 24 operating as a take-up reel in case the magnetic tape of the cassette tape player is fed in the forward direction. This endless rubber belt 18 is placed between the reel hub 24 and a pair of guide rolls 34, 36 positioned on both lateral sides of pinch roll intrusion opening 12 of the reel hub 24. These guide rolls 34, 36 are cylindrically-shaped and are rotatably supported by supporting shafts 33, 35 provided in the casing 3.

The endless rubber belt 18 is engaged by one of arm sections of a torsion coil spring 32 having its coil section supported by a supporting shaft 31 in the casing 3, and is placed under a constant tension by the resilient force of the torsion coil spring 32. The other arm section of the torsion coil spring 32 is positioned back of a wall section 38 provided inwardly of the pinch roll intrusion opening 12 and is retained by abutting against a retention pin 37 provided on the inner surface of the casing 3.

The forward end portion of the casing 3 of the endless rubber belt 18 is positioned in the vicinity of the forward edge of the capstan shaft insertion opening 14 in the pinch roll intrusion opening 12. When the casing 3 is loaded on the cassette tape player, the endless rubber belt 18 is positioned on the forward side of the capstan shaft 103 of the forward side portion of the casing 3, such that, when the pinch roll 102 is intruded into this pinch roll intrusion opening 12, the endless rubber belt 18 is clamped between the pinch roll 102 and the capstan shaft 103. If the capstan shaft 103 is rotated at this time, the endless rubber belt 18 is fed by the capstan shaft 103 and the pinch roll 102, as is the magnetic tape of the tape cassette, for rotating the reel hub 24, which in turn rotates the other reel hub 25.

When the pinch roll 102 is intruded into the pinch roll intrusion opening 12, that is, if the cassette tape player is executing the playback mode operation, the reel hubs 24, 25 are rotated by the endless rubber belt 18 for rotating the reel driving shafts 104, 105, for supporting the execution of the playback mode operation even if the cassette tape player has the so-called automatic shut-off function.

Figure 6:
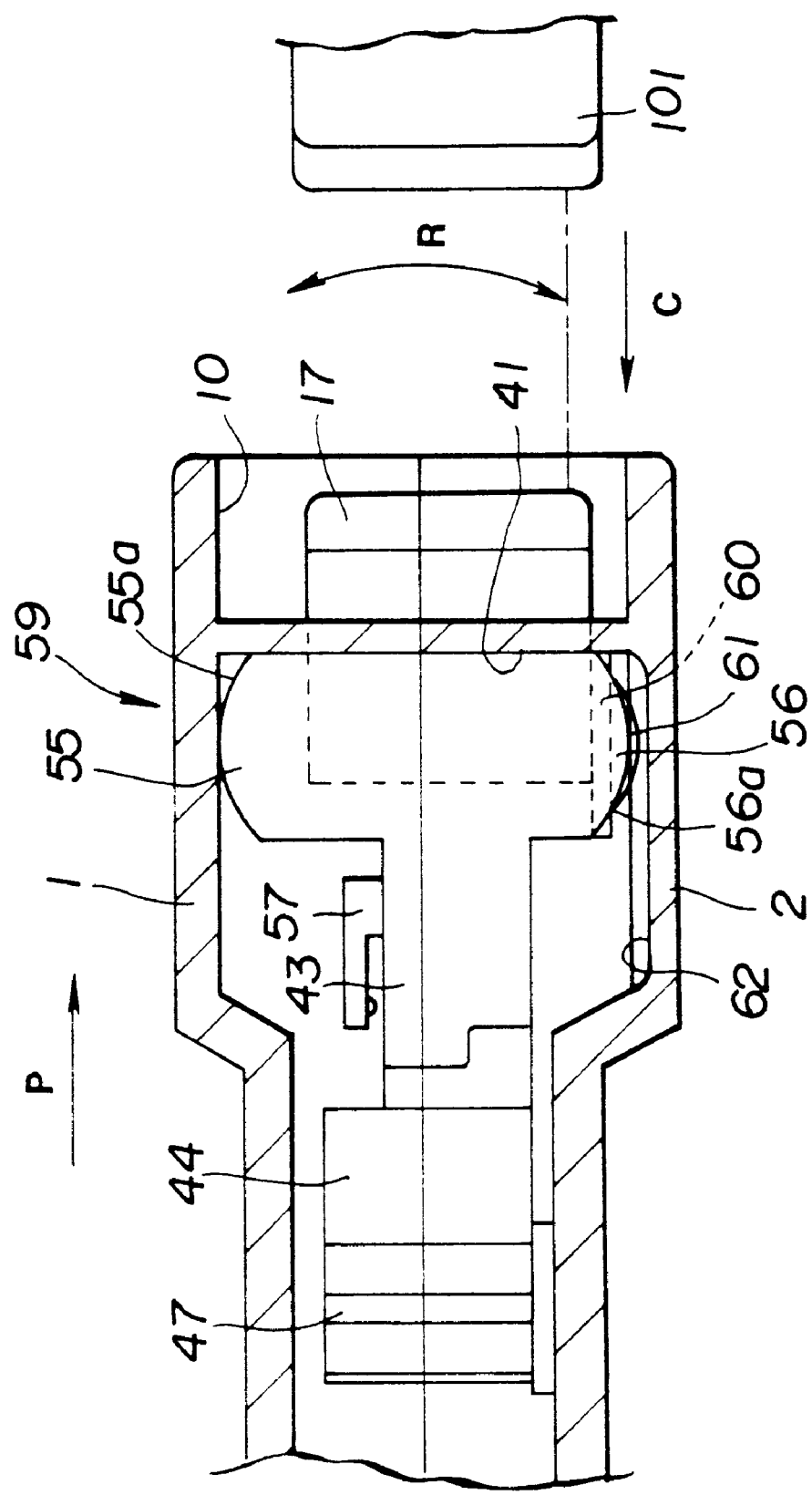
FIG. 6 is an enlarged cross-sectional view showing essential portions of a signal transmitting head of the connection device.
Figure 7:
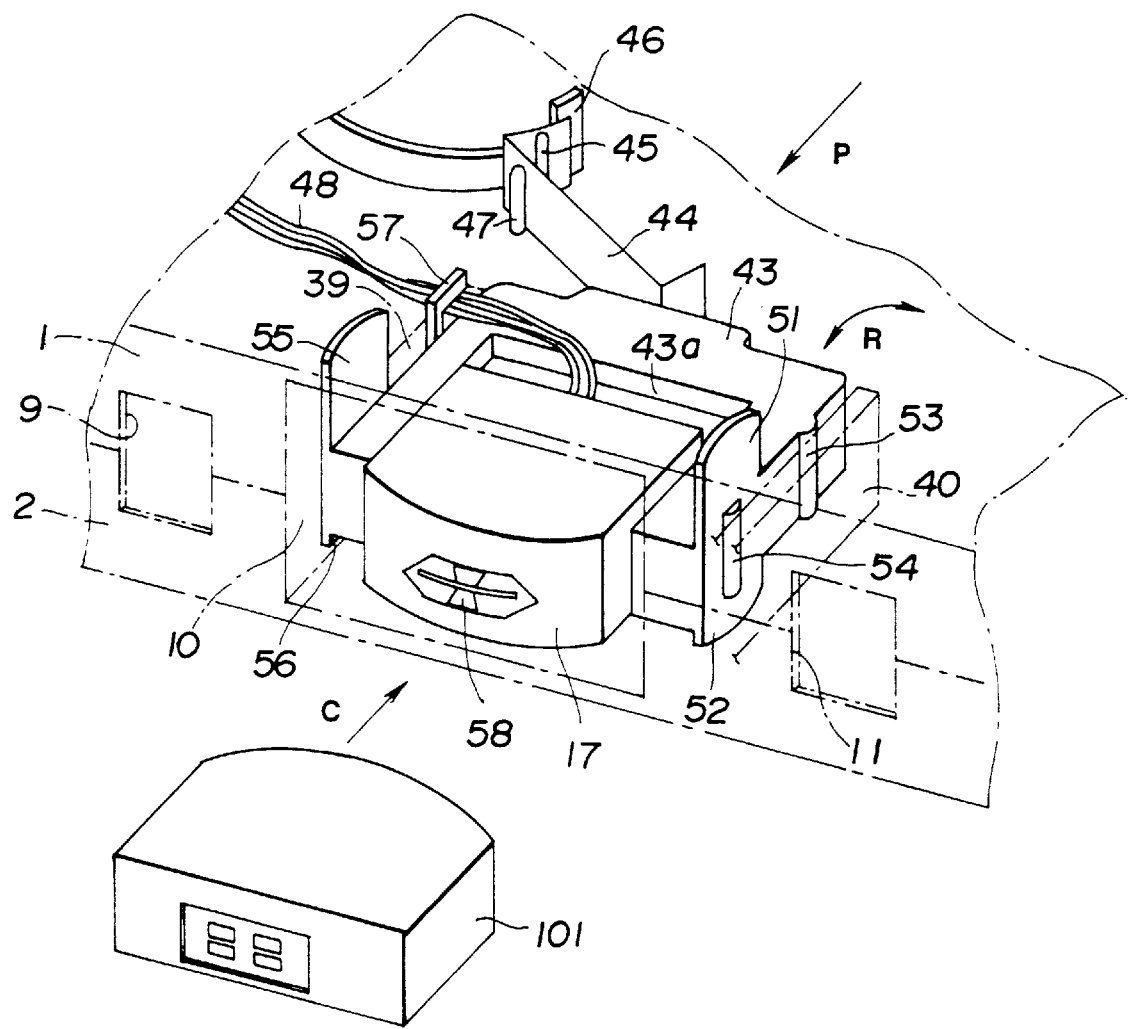
FIG. 7 is an enlarged perspective view showing essential portions of the signal transmitting head of the connection device.

Within the casing 3 is housed a signal transmitting head 17, inwardly of the magnetic head intrusion opening 10, for transmitting information signals to the magnetic head 101, as shown in FIGS. 6 and 7. Similarly to the magnetic head 101, the signal transmitting head 17 has a core having a magnetic gap 58, and a coil, not shown, for generating a magnetic field in the magnetic gap. The signal transmitting head 17 is arranged with its front side carrying the magnetic gap 58 facing towards the front of the casing 3.

The coil of the signal transmitting head 17 is connected to a connection cord 21, pulled out of the casing 3, via a lead wire 48 housed within the casing 3 and a relay substrate 49. This connection cord 21 is pulled outwards from the inside of the casing 3 via a cord lead-out opening 20 formed in a lateral edge an major surface, that is, towards the upper rear side, of the upper half 1. The foremost part of the connection cord 21 is provided with a connection plug 22 connected to a signal output terminal of an external acoustic device, operating as a sound source, such as an optical disc player. This connection plug 22 has a foremost terminal part 23 made up of a ground terminal, right (R) channel terminals and left (L) channel terminals 23a, 23b, 23c, arranged coaxially with and insulated from one another.

By connecting the connection plug 22 to a signal output terminal of the external acoustic device for actuating the device, audio signals as information signals outputted by this device are routed via relay substrate 49 and lead wire 48 to the coil of the signal transmitting head 17. The coil fed with the audio signals from the external acoustic device generates a magnetic field corresponding to the audio signals in a magnetic gap 58. The direction of the magnetic field generated in the magnetic gap 58 corresponds to the so-called gap direction of the magnetic gap 58 and is identical with the gap direction of the magnetic head 101 and with the magnetic tape running direction relative to the magnetic head 101.

When the casing 3 is loaded on the cassette tape player, the signal transmitting head 17 faces the magnetic head 101 of the cassette tape player. When the cassette tape player is in the playback mode, the magnetic head 101 is moved forwards by a movement mechanism in the tape cassette player, not shown, so as to be intruded into the magnetic head intrusion opening 10. Thus, the front surfaces of the signal transmitting head 17 and the magnetic head 101 are abutted against each other, with the respective magnetic gap portions substantially facing each other. More precisely, the signal transmitting head 17 is thrust by the magnetic head 101 towards the inside of the casing 3 against the bias of the spring plate as later explained. At this time, the pinch roll 102 is intruded into the pinch roll intrusion opening 12 within which it cooperates with the capstan shaft 103 for clamping the endless rubber belt 18.

In this state, the signal transmitting head 17 generates, in the magnetic gap 58, a magnetic field corresponding to the audio signals supplied via connection cord 21 from the external device, for transmitting the supplied audio signals to the magnetic head 101. The magnetic field generated in the magnetic gap 58 of the signal transmitting head 17 operates similarly to the magnetic field transmitted from a magnetic tape having recorded thereon the audio signals as the information signals when the magnetic tape is run in contact with the magnetic head 101.

In the connection device of the present embodiment, the front sides of the signal transmitting head 17 and the magnetic head 101 need to be reliably abutted against each other for assuring optimum transmission of the information signals to the magnetic head 101. If the magnetic gap portions of the signal transmitting head 17 and the magnetic head 101 are not in substantially facing relation to each other, the information signals cannot be transmitted optimally to the signal transmitting head 17.

Even granting that the mounting position of the magnetic head 101 in the cassette tape player is within a pre-set tolerance, still differs slightly from one product to another. Thus, in the connection device of the present embodiment, the signal transmitting head 17 is held in the casing 3 by a holding mechanism as now explained.

This holding mechanism has the function of biasing the magnetic head 101 in a direction towards the front end face of the casing 3, that is in a direction of abutment against the magnetic head 101, and of supporting the signal transmitting head 17 so as to follow the mounting state of the magnetic head 101 of the cassette tape player, that is the front end face of the magnetic head 101 contacted with the magnetic tape, for swinging or rotation about the direction extending along the front end face of the casing at right angles to the direction of thickness of the casing 23, that is along the direction of the magnetic gap 58 (direction of the generated magnetic field), as an axis of swinging or rotation. Therefore, if the magnetic head 101 is mounted with a tilt, the signal transmitting head 17 is rotated or swung so as to follow the tilt of the magnetic head 101.

This holding mechanism includes a head holder 43 carrying the signal transmitting head 17 for allowing for its rotation and a spring plate 44 for biasing the signal transmitting head 17 forwards, that is in a direction of abutting against the head 101.

The head holder 43 is formed of, for example, a synthetic material, substantially in the shape of a letter U in plan configuration, with a recess 43a towards the front mid portion and both arm sections extending forwards on both lateral sides of the recess 43a. The signal transmitting head 17 is adapted to be disposed in the recess 43a so that its lateral sides are held by the arm sections of the head holder 43.

The head holder 43 is supported and held for movement in the fore-and-aft direction and in the up-and-down direction (the direction of thickness of the casing 3) by having its lateral sides guided by a pair of guide wall sections 39, 40 provided inwardly of the magnetic head intrusion opening 10 in the casing 3. The distance between the guide wall sections 39, 40 is selected to be broader than the transverse width of the magnetic head intrusion opening 10. The portion between both lateral sides of the magnetic head intrusion opening 10 and the guide wall sections 39, 40 is occupied by left and right paired abutment wall sections 41, 42 facing the inner side (rear side) of the casing 3. The head holder 43 is prohibited from being dropped out of the casing 3 towards the front side via the magnetic head intrusion opening 10 by having the forward ends of the arm sections abutted against the abutment wall sections 41, 42.

The head holder 43 has arcuate protrusions 51, 52, 55, 56 at the forward sides of the arm sections for being protruded therefrom in the up-and down direction into abutment against the inner wall section of the casing 3, as shown in FIGS. 6 and 7. These arcuate protrusions 51, 52, 55 and 56 control up-and-down movement of the head holder 43 in the casing 3. The upper ends of the arcuate protrusions 51, 55 provided on the upper side of the head holder 43 are in the upwardly convex arc shape with the axis of the arc being the direction extending along the front end face of the casing 3 at right angles with the direction of thickness of the casing 3. By having the distal ends of the arcuate protrusions 51, 52, 55, 56 of the head holder 43 in sliding contact with the inner wall section of the casing 3, the signal transmitting head 17 can be swung or rotated about the direction extending along the front end face of the casing 3 at right angles with the direction of thickness of the casing 3 as the axis of rotation. The result is that, when the connection device is loaded on the cassette tape player, the signal transmitting head 17 is rotated to follow the tilt of the front side of the magnetic head 101, that is the tilt of the tape contacting surface of the magnetic head 101, for abutting the magnetic head 101 and the signal transmitting head 17 against each other.

On one lateral side of the head holder 43 are mounted a pair of slide contact ribs 53, 54 for smoothing the sliding contact of the head holder with the guide wall section 40. These slide contact ribs 53, 54 are protrusions in the form of semi-columnar protrusions as one with the head holder 43 with the axis of the cylindrical surface extending in the up-and-down direction. These slide contact ribs 53, 54 are abutted to and slid in contact with the guide wall 40 for reducing the force of friction between the holder 43 and the guide wall section 40 in order to permit the holder 43 to be moved easily under the bias of the spring plate 44 in a direction indicated by arrow P in FIG. 6. On the other side of the holder 43 is mounted a lead wire holder 57 which is a hook-shaped member formed as one with the head holder 43 operating for clamping a lead wire 48 in cooperation with the upper side of the head holder 43 for securing the lead wire 48 to the head holder 43.

The spring plate 44 has its rear end portion clamped and retained between retention pins 45, 47 provided in the casing 3, while having the proximity of the rear end thereof and the front end thereof abutted against and retained by a retention wall section 46 provided in the casing 3 and abutted against the rear end face of the head holder 43, respectively. The spring plate 44 resiliently biases the signal transmitting head 17 forwards, that is towards the magnetic head 101 intruded via the magnetic head intrusion opening 10. The biasing force exerted by the spring plate 44 is enough to keep the signal transmitting head 17 and the magnetic head 101 in abutting contact with each other even on application of vibrations or shock from outside.

Thus, with the present embodiment of the connection device, the signal transmitting head 17 can be rotated about the direction along the front end face of the casing at right angles with the direction of thickness of the casing 3 as the axis, while it can be moved in the fore-and-aft direction, and is resiliently biased forwards by the spring plate 44 in a direction indicated by arrow P in FIGS. 5 through to 7. If the casing 3 is loaded on the cassette tape player for executing the playback mode operation, the signal transmitting head 17 is thrust towards the inside of the casing 3 by the magnetic head 101 against the bias of the spring plate 44, so that the front surface of the signal transmitting head 17 spontaneously follows the tilt of the front surface of the magnetic head 101 of the cassette tape player, that is the tilt of the tape contact surface, by the arcuate protrusions 51, 52, 55 and 56 and the upper and lower inner wall sections of the casing 3. At this time, rotation of the signal transmitting head 17 about the up-and-down direction as the axis of rotation, that is, rotation in which the front surface of the head 17 is swung in the transverse direction, and rotation thereof about the fore-and-aft direction as the axis of rotation, that is, rotation in which the front surface of the head 17 is tilted transversely, are prohibited by the guide wall sections 30, 40.

In the present embodiment of the connection device, the signal transmitting head 17 is moved and rotated into reliable abutting contact with the front surface of the magnetic head 101, so as to follow the mounting state of the magnetic head 101 on the cassette tape player, without the necessity for the user to make any adjustment operations, for optimum transmission of the information signals from the signal transmitting head 17 to the magnetic head 101. The connection device is simplified in structure because there is no necessity of providing a position adjustment mechanism for adjusting the position of the signal transmitting head 17 to the magnetic head 101.

Meanwhile, the signal transmitting head 17 is mounted on the head holder 43 using a mounting plate 60 having its mid portion secured to the lower side of the signal transmitting head 17 and having both end portions protruded on both lateral sides of the signal transmitting head 17, as shown in FIGS. 8a to 9b. The mounting plate 60 is formed by a thin metal plate, also as shown in FIGS. 8a to 9b. The mounting plate 60 has a mounting hole 64 and a mounting recess 63 at opposite ends thereof, respectively, as shown in FIGS. 8a to 9b.

The forward ends of the bottom surfaces of the arm sections of the head holder 43 are formed as one with a pair of upstanding bosses 61a, 61a, as shown in FIG. 8a. These bosses 61a, 61a are inserted into the mounting hole 64 and into the mounting recess 63 during mounting of the signal transmitting head 17 to the head holder 43, as shown in FIGS. 8a and 8b. These bosses 61a, 61a are fused and collapsed at the distal ends thereof by a welding jig 201 when mounting the signal transmitting head 17 to the head holder 43.

Specifically, the welding jig 201 includes a pair of welding arms 202, 202 associated with the bosses 61a, 61a, as shown in FIG. 8a. The distal ends of these welding arms 202, 202 are formed with recessed welding portions 203, 203. These welding portions 203, 203 are thrust against the distal ends of the bosses 61a, 61a, as indicated by arrow D in FIG. 8, for fusing and collapsing the distal ends of the bosses 61a, 61a.

The bosses 61a, 61a, fused and collapsed at the distal ends thereof by the welding jig 201, prove to be welded bosses 61, 61, collapsed and enlarged in diameter in a flange shape as shown in FIGS. 9a and 9b. These welded bosses 61, 61 hold both ends of the mounting plate 60 by the distal end portions thereof in order to keep the signal transmitting head 17 connected to the head holder 43.

By mounting the signal transmitting head to the head holder 43 by welding using the bosses 61a, 61a, it becomes possible to simplify the structure of the head holder 43 and to facilitate the mounting operation of the signal transmitting head to the head holder 43.

On the inner wall section of the casing 3 facing the welded bosses 61, 61, on both sides directly below the signal transmitting head 17, are formed left and right paired boss clearance grooves 62, 62 for evading abutment of the welded bosses 61, 61 on the inner wall section of the casing 3, as shown in FIG. 6. These boss clearance grooves 62, 62 are formed in register with the range of movement of the welded bosses 61, 61.

In the above-described embodiment of the connection device, the arcuate protrusions 51, 52, 55, 56 are formed on the head holder 43. Alternatively, an arcuate recess may be formed in the inner surface of the casing 3 in register with the head holder 43, or an arcuate protrusion may also be formed on the inner surface of the casing 3 in register with the head holder 43 for rotatably supporting the signal transmitting head 17. Various other modifications may be made without departing from the scope of the invention.

What is claimed is:

1. A connection apparatus for use with a tape reproducing apparatus adapted to reproduce a magnetic tape for transmitting an output signal from a sound source to a tape reproducing apparatus, comprising:
   a housing shaped for enabling loading on a tape reproducing apparatus;
   a signal transmitting head arranged in an opening in said housing so as to be abutted against a magnetic head of a tape reproducing apparatus when said housing is loaded on a tape reproducing apparatus;
   signal transmission means for transmitting an output signal from a sound source to said signal transmitting head; and
   a supporting mechanism for supporting said signal transmitting head and biasing said signal transmitting head in a direction of abutment against a magnetic head of a tape reproducing apparatus and for rotatably supporting the signal transmitting head so as to meet any movement of a magnetic head of a tape reproducing apparatus.

2. The connection apparatus as claimed in claim 1, wherein said signal transmitting head is abutted against a tape contact surface of a magnetic head of a tape reproducing apparatus and wherein said supporting mechanism rotatably supports said signal transmitting head so that said signal transmitting head will follow a tape contact surface regardless of an orientation of a magnetic head of a tape reproducing apparatus.

3. The connection apparatus as claimed in claim 2, wherein said supporting mechanism rotatably supports said signal transmitting head about an axis of rotation that is perpendicular to a direction of thickness of the housing.

4. The connection apparatus as claimed in claim 2, wherein said supporting mechanism includes a holding member for holding said signal transmitting head and a biasing member for biasing said holding member in a direction of abutting the signal transmitting head held by said holding member against a magnetic head of a tape reproducing apparatus.

5. The connection apparatus as claimed in claim 4, wherein said holding member includes a holder for holding said signal transmitting head and wherein an arcuate protrusion is formed in said holder for permitting movement of the holder along a magnetic head of a tape reproducing apparatus.

6. The connection apparatus as claimed in claim 5, wherein said holding member further includes a mounting plate with at least one boss for mounting the signal transmitting head, wherein said signal transmitting head is mounted on said holder by caulking said boss inserted through said mounting plate.

7. The connection apparatus as claimed in claim 5, wherein said holding member is mounted on said housing for movement by said biasing member in a first direction in which said signal transmitting head is abutted against a magnetic head of a tape reproducing apparatus and in a second direction opposite to said first direction.

8. The connection apparatus as claimed in claim 7, wherein said supporting mechanism further includes a guide member provided in said housing for guiding said holding member in said first direction and in said second direction.

9. The connection apparatus as claimed in claim 1, wherein said signal transmission means includes a signal transmitting cable and a connector provided on one end of the signal transmitting cable for connection to a sound source.

10. The connection apparatus as claimed in claim 9, wherein said housing includes a second opening for leading out the signal transmitting cable from a major surface of said housing.

11. A connection apparatus for use with a tape reproducing apparatus adapted to reproduce a magnetic tape for transmitting an output signal from a sound source to a tape reproducing apparatus, comprising:

a housing shaped for enabling loading thereof on a tape reproducing apparatus, said housing including a pair of reel shaft inserting openings formed through opposing major surfaces thereof and an opening formed in one lateral surface of said housing;

a signal transmitting head provided in said housing for facing outwards via said opening, said signal transmitting head being abutted against a magnetic head of a tape reproducing apparatus intruded into said housing via said opening;

signal transmission means for transmitting an output signal from a sound source to said signal transmitting head; and a supporting mechanism for supporting said signal transmitting head and biasing said signal transmitting head in a direction of abutment against a magnetic head of a tape reproducing apparatus, said supporting mechanism rotatably supporting the signal transmitting head so as to meet any movement of a magnetic head of a tape reproducing apparatus.

12. The connection apparatus as claimed in claim 11, further comprising:

a pair of hubs arranged in said housing for engagement with a pair of reel shafts of a tape reproducing apparatus inserted into said pair of reel shaft insertion openings;

a transmission gear arranged in said housing and engaged with said hubs; and an endless belt arranged in said housing and placed around said hubs and clamped by a pinch roller and a capstan of a tape reproducing apparatus.

13. The connection apparatus as claimed in claim 11, wherein said signal transmitting head is abutted against a tape contact surface of a magnetic head of a tape reproducing apparatus and wherein said supporting mechanism rotatably supports the signal transmitting head for rotation so that the signal transmitting head will follow a tape contact surface regardless of an orientation of a magnetic head of a tape reproducing apparatus.

14. The connection apparatus as claimed in claim 13, wherein said supporting mechanism rotatably supports said signal transmitting head about an axis of rotation that is perpendicular to a direction of thickness of the housing.

15. The connection apparatus as claimed in claim 13, wherein said supporting mechanism includes a holding member for holding said signal transmitting head and a biasing member for biasing said holding member in a direction of abutting the signal transmitting head held by said holding member against a magnetic head of a tape reproducing apparatus.

16. The connection apparatus as claimed in claim 15, wherein said holding member includes a holder for holding said signal transmitting head and wherein an arcuate protrusion is formed in said holder for being protruded from said holder into abutment against an inner surface of the housing for permitting movement of the holder a the magnetic head of a tape reproducing apparatus.

17. The connection apparatus as claimed in claim 16, wherein said holding member further includes a mounting plate with at least one boss for mounting the signal transmitting head, wherein said signal transmitting head is mounted on said holder by caulking said boss inserted through said mounting plate.

18. The connection apparatus as claimed in claim 16, wherein said holding member is mounted on said housing for movement by said biasing member in a first direction in which the signal transmitting head is abutted against a magnetic head of a tape reproducing apparatus and in a second direction opposite to said first direction towards an inside of said housing.

19. The connection apparatus as claimed in claim 18, wherein said supporting mechanism further includes a guide member provided in said housing for guiding said holding member in said first direction and in said second direction towards the inside of said housing.

20. The connection apparatus as claimed in claim 11, wherein said signal transmission means includes a signal transmitting cable and a connecter provided on one end of the signal transmitting cable for connection to a sound source.

21. The connection apparatus as claimed in claim 20, wherein said housing includes a second opening for leading out the signal transmitting cable from one of the major surfaces of said housing.

* * * * *